United States Patent
Sengupta et al.

(10) Patent No.: US 11,800,444 B2
(45) Date of Patent: Oct. 24, 2023

(54) ASSET TRACKING SYSTEM

(71) Applicant: FIRE RESEARCH CORP., Nesconset, NY (US)

(72) Inventors: Neil Sengupta, Lexington, SC (US); Peter Luhrs, Nesconset, NY (US)

(73) Assignee: Fire Research Corporation, Smithtown, NY (US)

( * ) Notice: Subject to any disclaimer, the term of this patent is extended or adjusted under 35 U.S.C. 154(b) by 0 days.

(21) Appl. No.: 17/034,464

(22) Filed: Sep. 28, 2020

(65) Prior Publication Data

US 2021/0099952 A1 Apr. 1, 2021

Related U.S. Application Data

(60) Provisional application No. 62/907,274, filed on Sep. 27, 2019.

(51) Int. Cl.
| | |
|---|---|
| G06K 7/10 | (2006.01) |
| H04W 52/02 | (2009.01) |
| H04B 17/318 | (2015.01) |
| H04W 84/20 | (2009.01) |

(52) U.S. Cl.
CPC .... *H04W 52/0212* (2013.01); *G06K 7/10188* (2013.01); *G06K 7/10217* (2013.01); *H04B 17/318* (2015.01); *H04W 84/20* (2013.01)

(58) Field of Classification Search
CPC ............. H04W 52/0212; H04W 84/20; G06K 7/10188; G06K 7/10217; H04B 17/318; H04B 17/21; Y02D 30/70
See application file for complete search history.

(56) References Cited

U.S. PATENT DOCUMENTS

| | | | |
|---|---|---|---|
| 7,936,270 | B2 | 5/2011 | Britton, Jr. et al. |
| 8,373,562 | B1 * | 2/2013 | Heinze .................. G06Q 10/06 340/572.1 |
| 2011/0047015 | A1 | 2/2011 | Twitchell |
| 2011/0050424 | A1 | 3/2011 | Cova et al. |
| 2013/0265155 | A1 | 10/2013 | Wible et al. |
| 2016/0284185 | A1 * | 9/2016 | Maison .............. G06Q 10/0833 |
| 2017/0321923 | A1 | 11/2017 | Wiens-Kind et al. |
| 2020/0264255 | A1 * | 8/2020 | Bessems ................. G01S 11/06 |

OTHER PUBLICATIONS

International Search Report for International Application No. PCT/US2020/053039; 5 pages.
Written Opinion for International Application No. PCT/US2020/053039; 6 pages.

* cited by examiner

*Primary Examiner* — Minh Trang T Nguyen
(74) *Attorney, Agent, or Firm* — Taft Stettinius & Hollister LLP; Ryan O. White; Derek B. Lavender

(57) ABSTRACT

An asset tracking system that has a master notification unit, a reader relay unit in communication with the master notification unit, and a tag configured to be coupled to an asset. When the reader relay unit identifies a tag, the reader relay unit sends a signal to the master notification unit providing both a tag identifier and a reader relay unit identifier.

20 Claims, 5 Drawing Sheets

ASSET TRACKING SYSTEM

CROSS-REFERENCE TO RELATED APPLICATION

The present disclosure claims the benefit of U.S. Provisional Application No. 62/907,274 filed Sep. 27, 2019, the contents of which are hereby incorporated herein in entirety.

FIELD OF THE DISCLOSURE

The present disclosure relates to an asset tracking system, and more specifically to an asset tracking system that identifies a tag and a reader relay unit to determine the location of an asset.

BACKGROUND

Many service vehicles carry different assets that are required at a response site. Often, the assets carried by the service vehicle are crucial for achieving the desired outcome at the work site. Such service vehicles include emergency response vehicles such as ambulances, fire trucks, and the like. Other service vehicles are maintenance and construction vehicles that are typically configured to carry assets to be used at a jobsite. Regardless of the type of service vehicle, it is often imperative that the service vehicle be properly outfitted with the assets required for the response site or jobsite.

Currently, ensuring a service vehicle is properly outfitted with the required assets often involves a user physically checking the compartments of the vehicle or the like to ensure the assets are positioned therein. This process can be very time consuming and is prone to human error. Often, a service vehicle has many different compartments in which an asset may be stored and a user may forget to check one or more of the compartments only to realize an asset is missing once the service vehicle arrives at the response site or job site. Accordingly, there is a need for an asset tracking system that allows users of a service vehicle to quickly identify the presence and location of assets on a service vehicle.

SUMMARY

One embodiment is an asset tracking system for a service vehicle. The asset tracking system has a master notification unit, a reader relay unit in communication with the master notification unit, and a tag configured to be coupled to an asset. When the reader relay unit identifies a tag the reader relay unit sends a signal to the master notification unit providing both a tag identifier and a reader relay unit identifier.

In one example of this embodiment, the master notification unit is a radio frequency receiver and transmitter. In one aspect of this example, tags are detectable directly by the master notification unit. In another aspect of this example, the master notification unit provides a wireless network for a user to access.

In another example of this embodiment, there are multiple reader relay units providing a mesh network with the master notification unit. Yet another example has multiple reader relay units and the master notification unit determines which reader relay unit the tag is closest to by comparing the strength of a tag signal from each of the reader relay units. In another example, the reader relay unit implements a sleep mode in time intervals to reduce power consumption. In one aspect of this example, vehicle sensors provide inputs to enter and exit sleep mode.

In another example of this embodiment, the reader relay unit is positioned above an assigned storage location. In another example, the reader relay unit sends a signal to the master notification unit responsive to movement of a door identified by a sensor. Yet another example includes a notifier in communication with the master notification unit to indicate the presence of the tag at the reader relay unit.

Another embodiment of this disclosure is a service vehicle that has a cargo area, a passenger area, a first storage location defined in the cargo area, a first reader relay unit positioned proximate to the first storage location, a master notification unit coupled to the service vehicle and configured to communicate with the first reader relay unit, and a tag configured to broadcast a tag ID to the first reader relay unit. In this embodiment, the first reader relay unit is configured to identify the tag ID when the tag is in the first storage location and communicate with the master notification unit the tag ID and a first reader relay ID.

One example of this embodiment includes a second reader relay unit positioned proximate to a second storage location defined in the cargo area. In one aspect of this example, the second reader relay unit is configured to communicate to the master notification unit through the first reader relay unit. As part of this aspect, the second reader relay unit has a second reader relay ID and when either the first reader relay unit or second reader relay unit identify the tag ID both the tag ID and the corresponding first or second reader relay ID are communicated to the master notification unit. Another aspect of this example has a remote reader relay unit positioned at a location separated from the service vehicle and the remote reader relay unit configured to identify the tag ID when the tag is in a remote location proximate to the remote reader relay and communicate wirelessly with the master notification unit the tag ID.

Yet another embodiment of this disclosure is a method for tracking an asset. The method includes providing a master notification unit in communication with a first reader relay unit and providing a tag, positioning the first reader relay unit proximate to a first assigned storage location, storing information regarding the first assigned storage location associated with the first reader relay unit in a memory unit, and monitoring, with the first reader relay unit, for the tag. In this method, the first reader relay unit is configured to communicate a tag ID and a first reader relay unit ID to the master notification unit when the tag is positioned in the first assigned storage location.

One example of this embodiment includes coupling the tag to an asset and storing an asset description in the memory unit and associating the asset description with the tag ID. One aspect of this example includes providing a second reader relay unit, positioning the second reader relay unit proximate to a second assigned storage location, storing information regarding the second assigned storage location associated with the second reader relay unit in the memory unit, and monitoring, with the second reader relay unit, for the tag. The second reader relay unit is configured to communicate the tag ID and a second reader relay unit ID to the master notification unit when the tag is positioned in the second assigned storage location. Part of this aspect includes identifying a tag signal with both the first reader relay unit and the second reader relay unit and comparing a signal strength of the first reader relay unit with a signal strength of the second reader relay unit and assigning the tag to the corresponding first or second assigned storage location assigned to first or second reader relay unit identifying the greatest signal strength.

BRIEF DESCRIPTION OF THE FIGURES

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
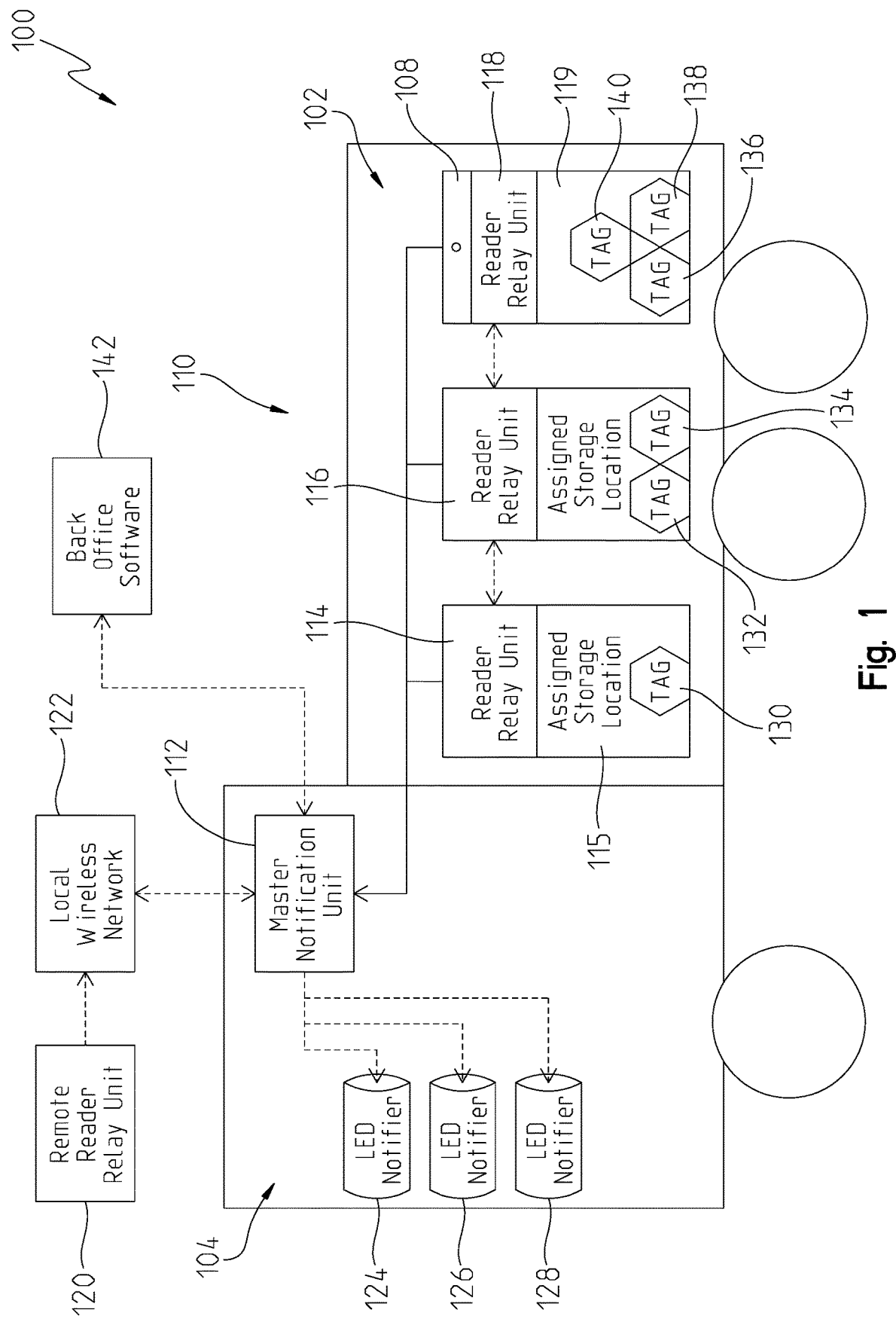
FIG. 1 is a schematic view of a service vehicle.
Figure 2:
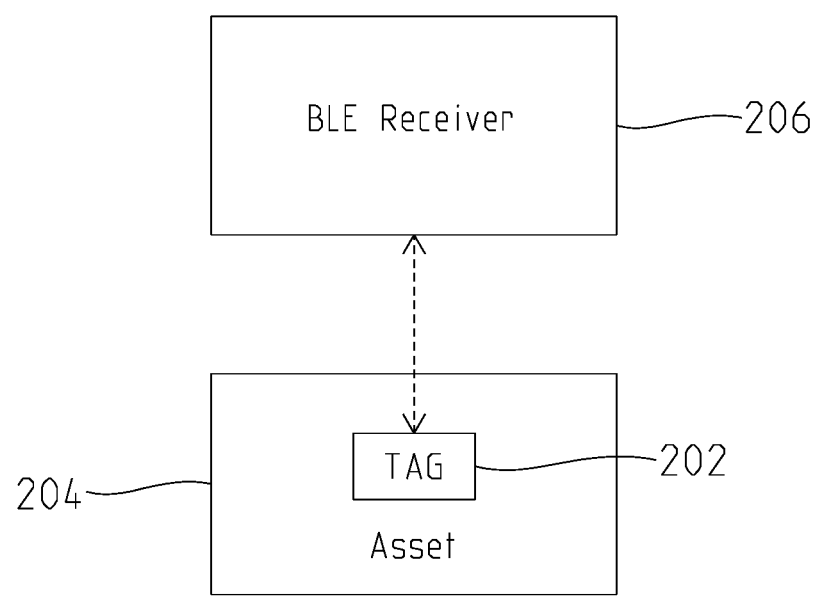
FIG. 2 is a schematic view of one embodiment of a tag and a receiver.

In FIG. 1, a schematic representation of a service vehicle 100 is illustrated. The service vehicle 100 may be any type of service vehicle, such as a fire truck, ambulance, police car, construction vehicle, mining vehicle or the like. The service vehicle 100 may have a chassis or frame and wheels or other ground-engaging mechanisms that allow the service vehicle 100 to selectively move along an underlying surface. The service vehicle 100 may be selectively powered by a prime mover such as a gasoline or diesel engine. Accordingly, while a specific type of service vehicle 100 will be discussed in detail herein, this disclosure considers implementing these teachings with any type of service vehicle that may transport an asset.

In the non-exclusive example of FIG. 1, the service vehicle 100 may be illustrative of a fire truck having a cargo area 102 and a passenger area 104 coupled to the chassis or frame. Generally, the cargo area 102 may be the area of the service vehicle 100 configured to store and transport various assets. For the illustrative service vehicle 100 of FIG. 1, the assets stored and transported in the cargo area 102 may include hoses, oxygen bottles, nozzles, protective equipment such as masks, jackets, and helmets, demolition equipment, and any other asset that may be required by the users of the service vehicle 100 at a response site.

In one non-exclusive example, the cargo area 102 may have one or more cargo bay 106 therein. The cargo bay 106 may be a specific compartment of the cargo area that is substantially isolated from other compartments of the cargo area 102. In one non-exclusive example, the cargo bay 106 may have a door 108 thereon that selectively provides access to the interior region of the cargo bay 106. The door 108 may slide vertically between an open and closed position (illustrated in the open position in FIG. 1). Alternatively, the door 108 may be hinged at one side and rotate about the hinge between an opened and closed position. Further, any other known configuration may be utilized for the door 108 of the cargo bay 106.

The passenger area 104 may be configured to transport passengers in the service vehicle 100 to the response site. The passenger area 104 may contain a plurality of seats in which the passengers may be positioned and secured to the service vehicle 100 with a seatbelt or the like restraint. The passenger area 104 may also have a driver's seat wherein a driver may be positioned to drive the service vehicle 100 to the response site. The passenger area 104 may have one or more user interface viewable by the passengers and/or driver to identify the status of the service vehicle 100 among other things.

In one aspect of this disclosure, the service vehicle 100 may have an asset tracking system 110 configured partially therein. The asset tracking system 110 may comprise a Master Notification Unit ("MNU") 112 that processes information for the asset tracking system 110 among other things. The MNU 112 may have one or more processor and communicate with a memory unit. The MNU 112 may have algorithms, source code, equations, lookup tables, or any other computer readable and/or executable commands stored thereon to implement the teachings of this disclosure.

The MNU 112 may communicate with one or more Reader Relay Unit ("RRU") 114, 116, 118, and 120. The MNU 112 may communicate with the RRUs utilizing any known wired or wireless communication protocol. In one non-exclusive example, the MNU 112 may communicate with the RRUs 114, 116, 118 through a wired connection utilizing copper or other similarly conductive materials. Further still, the MNU 112 and the RRUs 114, 116, 118 may communicate with one another through a CAN bus or other similar network protocol of the service vehicle 100. Accordingly this disclosure contemplates utilizing any known wired or wireless form of communication to allow the MNU 112 to communicate with the RRUs 114, 116, 118, and 120. Further, the specific number and location of RRUs illustrated in FIG. 1 is only exemplary, and more or fewer RRUs may be implemented in other configurations.

Each RRU 114, 116, 118 on the service vehicle 100 may be associated with a corresponding storage location 115, 117, 119. The storage locations 115, 117, 119 may be specific locations on the service vehicle 100 where a particular asset is typically stored. In one non-exclusive example, the storage location 115 may be where bottles are typically stored, the storage location 117 may be where hoses are typically stored, and storage location 119 may be where demolition equipment is stored. However, the storage areas 115, 117, 119 can be utilized for any type of asset, and the particular assets discussed herein are simply provided as a non-exclusive example.

The storage locations 115, 117, 119 may be enclosed or open to the surrounding environment depending on the type of asset being stored therein and the type of service vehicle. In the example of FIG. 1, the storage area 119 may be closed and isolated from the surrounding environment when the door 108 is in a closed configuration. Accordingly, any of the storage locations 115, 117, 119 discussed herein may implement a door or the like to fully enclose the storage location. Each storage location with a door may also have a sensor that identifies when the door is in an opened orientation. Further, more or less storage locations may be implemented on the service vehicle 100 and the particular location and number of the storage locations is only exemplary.

Firmware on each RRU 114, 116, 118, and 120 executes and manages the RRUs antenna signal reach. Each RRU 114, 116, 118, and 120 may operate consecutively in a receive mode and then in transmit mode for an interval of time. When in receive mode, the firmware on the RRU may lower antenna strength. The lowered antenna strength may ensure that the RRU will typically only detect broadcasts from devices such as tags 202 when the tag 202 is within the corresponding storage location 115, 117, 119 of the corresponding RRU 114, 116, 118. When in transmit mode, the RRU antenna strength is raised so that the RRU can transmit information about any detected tags 202 within the corresponding storage location to the MNU 112. The RRU transmits a unique RRU identification along with a detected tag ID to the MNU 112.

The remote RRU 120 may be positioned at a location remote from the service vehicle 100. For example, the remote RRU 120 may be positioned at a home base of the service vehicle 100, such as a fire station or other storage location for the service vehicle 100. The remote RRU 120 may connect with a local wired or wireless network 122 to selectively communicate with the MNU 112. In one aspect of this disclosure, the MNU 112 can wirelessly communicate with the local wireless network 122 to communicate with the remote RRU 120. The MNU 112 may use any known wireless communication protocol to communicate with the local wireless network 122 such as known wireless network protocols, known cellular protocols, and any other known wireless communication.

The MNU 112 may also communicate with one or more notifier 124, 126, 128. The notifiers 124, 126, 128 may provide an indication of an asset location to users in the passenger area 104. In one non-exclusive example, the notifiers 124, 126, 128 are LED indicators that selectively illuminate when instructed by the MNU 112. Alternatively, the notifiers 124, 126, 128 may be shown on a user display or user interface. Further, the notifiers 124, 126, 128 can be any audible, visual, or haptic signal that is noticeable by a user. While the notifiers 124, 126, 128 are illustrated in the passenger area 104 in FIG. 1, this disclosure also contemplates positioning the notifiers 124, 126, 128 outside of the passenger area 104 as well, wherein the notifiers 124, 126, 128 can be identified from outside of the passenger area 104.

In one aspect of this disclosure, the MNU 112 and RRUs 114, 116, 118, 120 are configured to identify one or more asset tag or tag 130, 132, 134, 136, 138, 140 (generally referred to as a tag 202). The tags may utilize a Bluetooth Low Energy protocol to communicate with the MNU 112 and/or RRUs 114, 116, 118, 120. However, any other known wireless communication protocol is also considered herein for the tag 202. Generally, the tags 202 are packaged in a relatively small configuration so the tags 202 can be easily coupled to a corresponding asset. As will be described in more detail herein, the tags 202 are associated with a corresponding asset 204 and coupled thereto. In this configuration, when the MNU 112 and/or RRU 114, 116, 118, 120 identifies a tag 202, the presence of the tag 202 may be interpreted to include the corresponding asset 204.

In the present disclosure, the presence or absence of an asset 204 from a designated location may be determined. More specifically, the MNU 112 and any one or more RRU 114, 116, 118, 120 (generally referred to as a BLE Receiver 206) may utilize Radio Frequency signal tuning to determining whether an asset 204 could be considered to be present at its designated location with reference to the associated tag 202.

The term "Radio Frequency" or "RF Communication" is used to refer to a broad class of electro-magnetic communications over a wide range of frequencies ranging from as low as about 9 Khz to as high as about 300 Ghz. Bluetooth and Bluetooth Low Energy ("BLE") are forms of RF Communication which use the ISM band of about 2.4 GHz.

The tags 202 discussed herein may function as a BLE beacon that is physically attached to an asset 204. The tag 202 broadcasts a unique identifier over the BLE advertisement protocol that identifies that specific tag 202. The tags 202 may have a small form factor that can easily be affixed to the asset 204. The tags 202 may be battery powered and broadcast a unique Tag ID over the 2.4 GHz ISM band among others. The transmission range of the tags 202 can vary from being as low as less than a about a centimeter to as high as about 50 meters or more depending on the environmental and physical conditions. The usage of low energy consumption technology allows the tags to operate for long periods of time ranging from about 12 to about 36 months or more, depending on the frequency of broadcast and duration of each broadcast.

The tags 202 may be used in combination with the BLE receiver 206 in the MNU 112 or any of the RRUs 114, 116, 118, 120 for proximity-based identification and notification of the corresponding tag 202. More specifically, when a tag 202 is within the range of a BLE receiver 206 of the MNU 112 or any of the RRUs 114, 116, 118, 120, the BLE receiver 206 can read the unique tag ID being broadcast by the tag 202 and recognize the presence of the tag 202 in its proximity.

In another embodiment, the tags 202 may contain a Global Positioning System ("GPS") transmitter/receiver capable of communicating to the MNU 112 or any of the RRUs 114, 116, 118, 120 or other device the precise location of the tag 202. The term "GPS" refers to any known form of location tracking and monitoring. More specifically, "GPS" may include protocols for any Global Navigation Satellite System ("GNSS") and includes considerations for any protocol developed by any nation. For example, "GPS" may include utilizing the GLONASS system, the Galileo system, and the BeiDou system among others.

One or more of the tags 202 are physically attached to an assets 204 such as equipment and tools that are used at the service location by users of the service vehicle 100. The tag ID of the tag 202 associated with the specific asset 204 is stored in one or more of the MNU 112 or RRU 114, 116, 118, 120 along with a description of the particular asset 204 associated with the specific tag ID of the tag 202. The broadcast identifier may be referred to as the tag ID. In one aspect of this disclosure, tags 202 are IP67 standards compliant.

The term "Assigned Storage Location" or "ASL" is a physical location such as a compartment on a vehicle or a fixed storage container at a warehouse or the like. The ASL is fixed relative to a vehicle or relative to a physical site. Each asset 204 may have an ASL wherein the asset 204 is typically stored. In the non-exclusive example of FIG. 1, tag 130 is affixed to an asset intended to be stored in the storage location 115, tags 132 and 134 are affixed to assets that are typically stored in storage location 117, and tags 136, 138, 140 are affixed to assets typically stored in storage location 119. In one aspect of this disclosure, the asset 204 is a physical and moveable piece of equipment or a tool that is routinely removed from the service vehicle and needs to be tracked for proper recovery and storage.

Each RRU 114, 116, 118, 120 may comprise a dual mode BLE receiver and transmitter. Any number of RRUs may be stationed at any number of specific ASLs. Each RRU may be assigned an RRU identification and the RRU identification may be logically associated with the specific ASL of the RRU. In the example of FIG. 1, the RRU 114 is associated with the storage location 115, the RRU 116 is associated with the storage location 117, the RRU 118 is associated with the storage location 119, and the remote RRU 120 is associated with a remote location. Each RRU 114, 116, 118, 120 may have unique identifier associated with it as an RRU identification. Each RRU may monitor for tag IDs broadcast from tags 202 in or around their corresponding ASL.

As discussed herein, the MNU 112 receives transmissions from one or more RRU 114, 116, 118, and 120. The MNU 112 may execute firmware that has a look up table or the like containing information regarding which RRU is logically associated with an ASL and which tags are designated to be at that particular ASL. The lookup table may be pre-programmed into a memory unit of the MNU 112 or selectively input by a user through a back office software 142. The MNU 112 firmware executes logic that checks to see if a message having a combination of an RRU ID and a tag ID associated with the ASL at which the RRU is stationed has been received within a certain time interval. If such a message has been received, the MNU 112 considers the asset 204 associated with the tag 202 to be present at the ASL of the RRU. If a message has not been received by the MNU 112, the asset 204 expected to be in the corresponding ASL is designated as being absent.

The MNU 112 may have an electronic RF receiver and transmitter unit that is capable of receiving broadcasts from BLE devices such as tags 202. The BLE receiver & notifier of the MNU 112 can detect broadcasts from tags 202 when a tag 202 is within the receive range of the MNU 112 receiver. The MNU 112 can identify the tag ID associated with the broadcasting tag 202. The tag ID may then be processed to notify other software systems and/or human interface devices through the back office software 142 or the like.

In one non-exclusive example, the MNU 112 hosts a local Wi-Fi hot spot that users can connect with to access the back office software 142. The back office software 142 may provide information regarding any asset's 204 presence/absence and location (relative vehicle proximity) information based on the detection or lack thereof of the tag 202 associated with the asset 204. The MNU 112 may have optional internet connectivity over either local wireless networks or known cellular protocols. The internet connectivity of the MNU 112 may be used to connect with the back-office software 142.

In one aspect of this disclosure there can be situations where the physical distance, among other parameters, may be such that direct communication with the MNU 112 and an RRU may not be possible, or may be unstable, due to degradation of the RF signal. In order to overcome situations of signal degradation, the asset tracking system 110 utilizes a mesh network in which each RRU 114, 116, 118, 120 communicates with the MNU 112 as well as neighboring RRUs. In this embodiment, messages from an RRU farther downstream from the MNU 112 will be relayed to the MNU 112 by neighboring RRUs in the range of the both the MNU 112 and downstream RRU. In other words, each RRU may be configured to relay signals from neighboring RRUs.

In the non-exclusive example of FIG. 1, the RRU 118 may not be able to communicate directly with the MNU 112 because of the distance there between. However, one or more of the RRUs 114, 116 may be able to adequately communicate with the MNU 112. In this configuration, the RRU 118 may communicate with RRU 114 and/or RRU 116 through a mesh network to process information to the MNU 112. In other words, the status of any tags 202 identified by the RRU 118 may be relayed from the RRU 118 through one or more of RRUs 114, 116 to the MNU 112. Both the RRU ID and the Tag ID may be passed on to the MNU 112 so the MNU 112 can associate the tag 202 with the proper ASL of the RRU 118. Accordingly, each RRU 114, 116, 118, 120 may act as a scanner to read tags 202, a broadcaster to send information to the MNU 112 and neighboring RRU's, and rebroadcaster or relayer that passes on information received from other RRUs.

In another aspect of this disclosure, the MNU 112 may identify which RRU is closest to the tag 202 by comparing the signal strength of multiple RRUs. More specifically, upon receipt of a tag ID from one of more RRUs, the MNU 112 logic may identify the signal strength of each RRU identifying that specific tag ID and make a determination of which RRU the tag 202 was closest to based on the strongest signal strength.

In one aspect of this disclosure, the RRUs 114, 116, 118, 120 may implement a power saving routine. More specifically, scan and broadcast operations consume significant battery power on the RRU. Accordingly, each of the RRUs may employ a time windowed approach to not broadcast and scan continuously. In the time windowed approach, each RRU may scan for an interval of time and broadcasts the messages it receives before going into a sleep phase for pre-defined interval of time before the cycle is repeated.

In one non-exclusive example, once a service vehicle is in motion and after a scan and broadcast is done for a certain time period following start of motion, the logical presence or absence of an expected stored asset has already been determined and subsequent detection may not be necessary until another event happens, such as the elapse of a time period or vehicle motion stop. Along with the elapsed time period and vehicular motion events, the system architecture includes the use of events that utilize light sensors and actuators to determine when a storage compartment is open. In this configuration, scanning and broadcasting from the RRU can be suspended until the compartment is closed. In other words, the system may check storage/absence of an asset 204 after a typical storage process that involves closing a compartment door such as door 108 or the like.

One embodiment of this disclosure implements notifiers 124, 126, 128 such as Light Emitting Diodes ("LEDs"). The notifier may be a small device with LED lights and the capability to communicate over BLE. The notifier may be mounted in the passenger area 104 or any other location where it is clearly visible. The device will receive messages from the MNU 112 and will send a notification if an asset 204 is not in its assigned location.

While an LED notifier is discussed herein, the notifiers 124, 126, 128 may utilize any known form to communicate messages from the MNU 112. More specifically, in another embodiment the notifiers 124, 126, 128 may utilize a Liquid Crystal Display (LCD) or the like screen to display messages from the MNU 112. Further, a notifier may be any device that gives a visual and/or auditory alert to the user when attention is required with regard to an asset's presence or absence status. The notifier can be devices such as, but not limited to, alert LED lights, alert messages on a LCD display, a buzzer, haptic feedback, or the like. Further, while a specific number of notifiers 124, 126, 128 is illustrated herein, this disclosures contemplates utilizing fewer and more notifiers as well.

The back office software 142 may be a web browser based application that is hosted locally on a server or remotely in a cloud-type server. The application includes a database that houses information such as master asset list, association of assets with specific vehicles and locations within the vehicle, association of assets with tags, and asset presence and absence history among other things. The application is used for registering new assets and tags as well as updating information on existing assets and tags. MNU 112 units on the vehicles will connect to the back office software 142 over wired or wireless connection (such as Wi-Fi or cellular) and download the most recent asset 204, tag 202, vehicle, and location relationship data. Further, the back office software 142 may provide user inputs for a user to modify any of the information discussed herein.

Regarding setup of this system, a unique tag 202 will be physically attached to each asset 204 that is to be tracked. Further, each vehicle implementing this disclosure will have a MNU 112 that is power by the vehicles 12/24 V DC power source. The MNU 112 may also equipped with an on onboard GPS receiver which provides latitudinal and longitudinal coordinates of the vehicle location. Alternatively, the MNU 112 may communicate with a GPS system of the service vehicle 100 to obtain position information.

Each MNU 112 has one or more of cellular and Wi-Fi based connectivity for uploading data to the back-office software 142. In one aspect of the setup, the MNU 112 hosts a local Wi-Fi hot spot with a unique SSID and also hosts a web browser accessible application. The local web application on the MNU 112 can be accessed by users operating web browsers on Windows, Android, IOS and other devices that connect with the MNU's 112 hot-spot. In one aspect of this disclosure, the MNU 112, in combination with the RRUs, form a mesh or bridge providing increased BLE coverage across the vehicle and broader access to tag IDs.

In operation, an asset 204 is logically assigned to a vehicle through the back-office software 142. The logical association of an asset 204 to a vehicle is periodically copied to a vehicle local database on the MNU 112. Assets 204 may be removed from the assigned vehicle and taken away from the vehicle for usage at a work site among other things. Once an asset 204 is out of the receive range of the asset tracking system 110, the MNU 112 logically designates the status of the asset 204 to be "Absent." When an asset 204 is returned to its pre-assigned ASL and the asset 204 is in the receive range of the asset tracking system 110, the asset tag ID is readable by the MNU 112 and the asset 204 is marked as being logically present. The status of an asset 204 can be viewed locally in and around the vehicle by end users with a web browser and the local Wi-Fi hot spot, via the notifiers 124, 126, 128, and among other ways. The MNU 112 may periodically upload asset 204 presence and absence data to the remote back office software 142 over either a Wi-Fi or Cellular internet connection. The MNU 112 may also record and transmit the GPS location of the vehicle to which the asset 204 is assigned, and the time that the absence/presence status is changed among other things.

The back office software 142 may be an end user application that is database enabled. The back office software 142 may be used for storing and reporting a variety of asset related data such as: location history, status history, assigned Vehicle, Assigned Asset Tag ID, description, date entered service, active/inactive status, date last serviced, date next service required, dimensions, weight, and cost to give a few non-exclusive examples.

In one aspect of this disclosure, the tags 202 are reusable and can be moved from one asset 204 to another. Detaching a tag 202 from an asset 204 "Asset X" and attaching it to another asset 204 "Asset Y," simply involves programming the logical mapping of the tag 202 from Asset X to Asset Y using the back office software 142.

Figure 3:
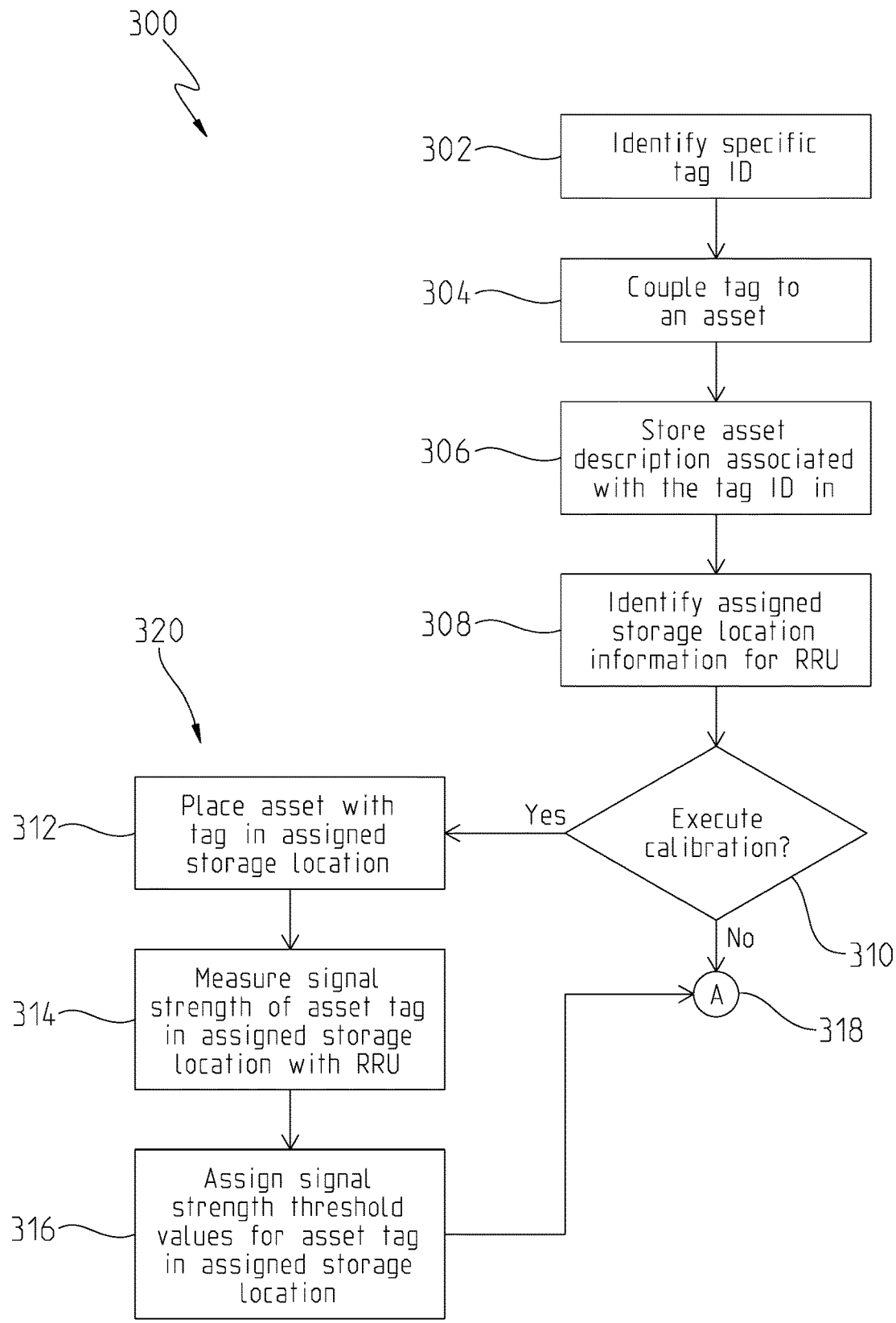
FIG. 3 is a partial exemplary logic flow chart illustrating the logic of an asset tracking system.
Figure 4:
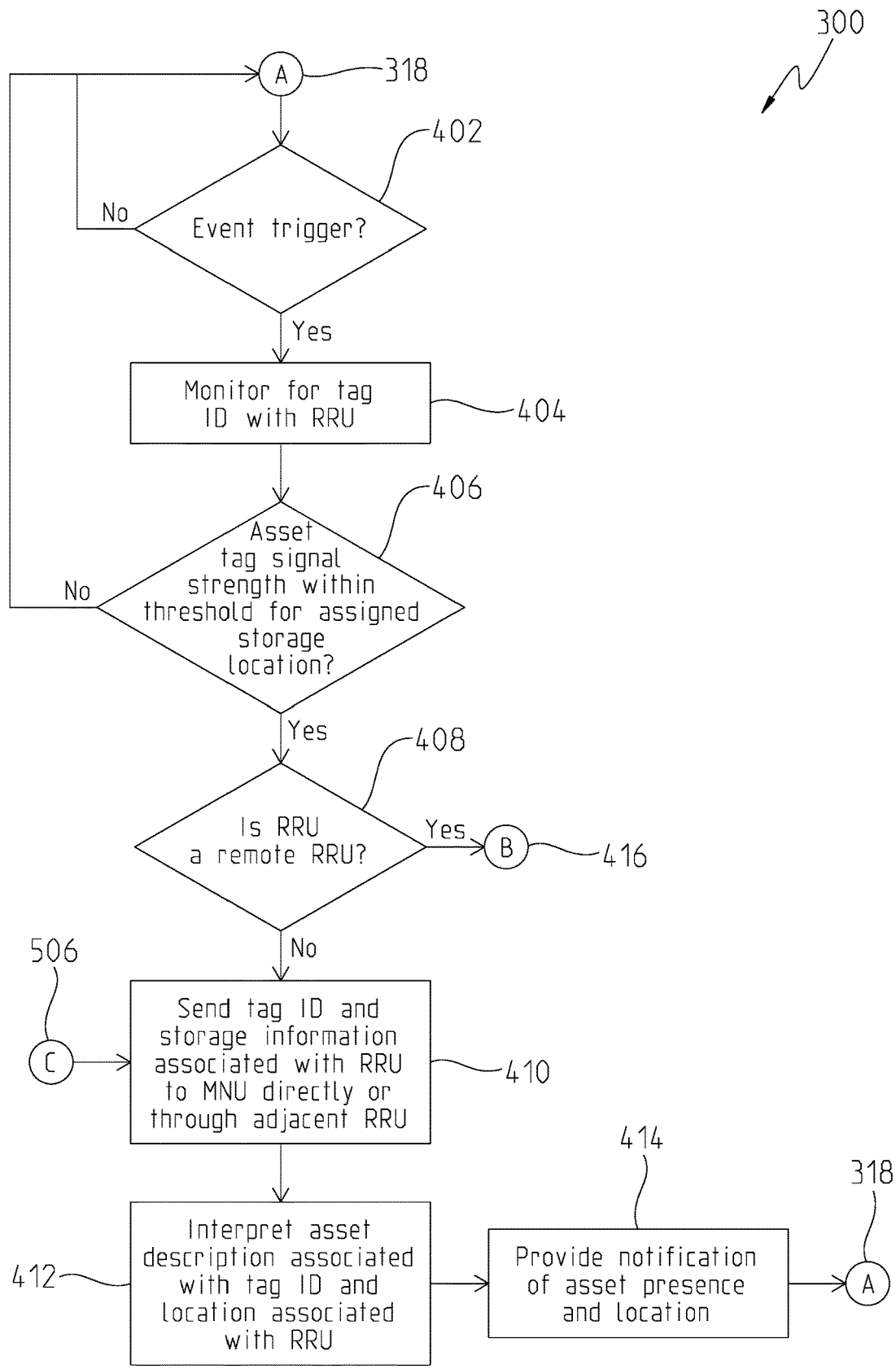
FIG. 4 is a continuation of the exemplary logic flow chart of FIG. 3.
Figure 5:
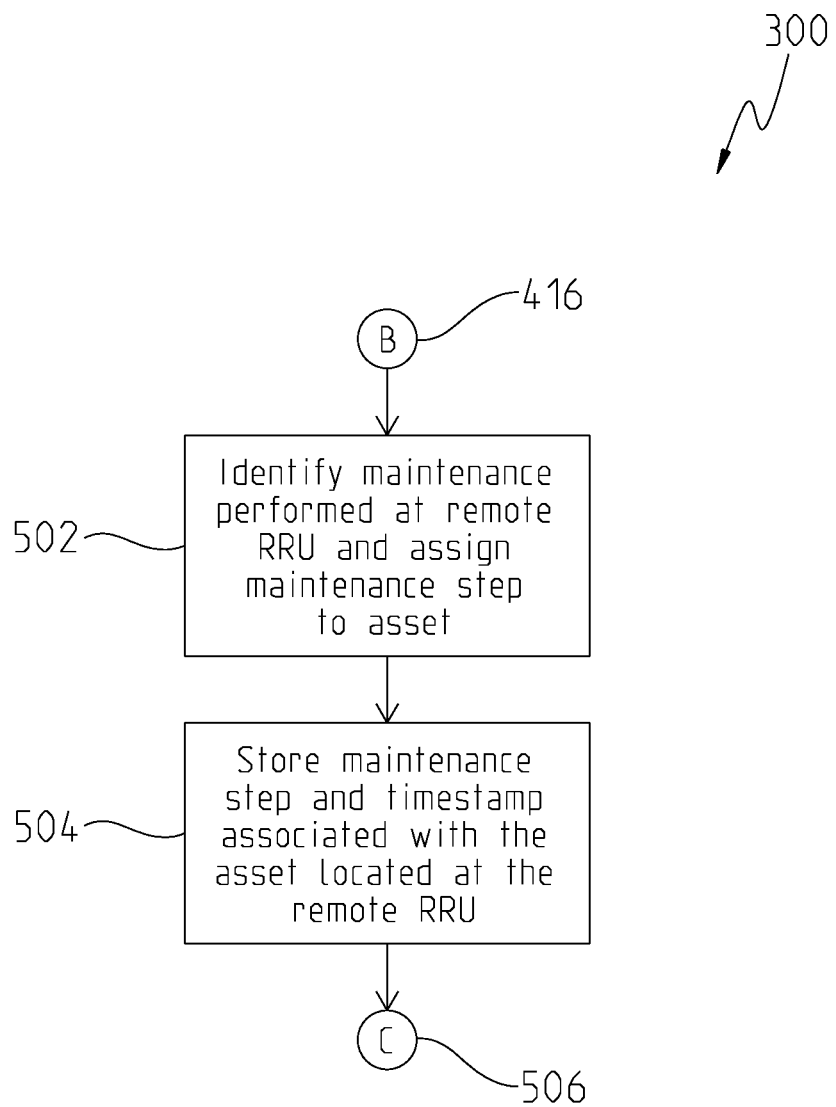
FIG. 5 is a continuation of the exemplary logic flow chart of FIG. 4.

Referring now to FIGS. 3-5, one exemplary logic flow chart 300 will be described in detail. Initially, a specific tag ID may be identified and stored via the back office software 142 or any other input method in box 302. The specific tag ID may be an alpha-numeric identifier printed on the tag 202. Alternatively, the tag ID may be a scannable image that identifies the specific tag ID associated with the tag 202. Further still, the tag ID may be identified by placing the tag 202 by an RRU or the MNU 112 and utilizing the back office software 142 to identify all tag ID's. Regardless of the methodology, in box 302 the specific tag ID for a tag 202 is stored in the asset tracking system 110.

The tag 202 may also be coupled to an asset 204 in box 304. The tag 202 may have a small form factor that is easily coupled to many different types of objects. In one non-exclusive example, the tag 202 may have a through hole that allows a clip to be fastened to the tag 202 so the tag 202 can easily be clipped onto an asset 204. Alternatively, the tag 202 may have an adhesive backing thereon that allows the tag 202 to be coupled to an asset 204 with an adhesive. Further still, the tag 202 may be sewn or otherwise formed into the material of an asset 204. Accordingly, this disclosure contemplates any known method for coupling a tag 202 to an asset 204 in box 304.

In box 306, an asset description may be assigned to the specific tag ID of the tag 202 coupled to the asset 204 in box 304. The back office software 142 may provide a user input wherein the user can describe the asset 204 coupled to the tag 204. The description associated with the tag 202 may be used to provide a quick reference for a user to identify what asset 204 is present or missing from the service vehicle 100.

In box 308, the tag 202 may be assigned a specific ASL in which the asset 204 would typically be stored. In the example of FIG. 1, the tag 130 is in ASL 114 and therefore the RRU 114 would be assigned to that particular tag 130 since the asset 204 of the tag 130 is intended to be stored at that particular ASL 115. The back office software 142 may also assign specific descriptions for the ASLs associated with the particular RRU. For example, in FIG. 1 the RRU 114 may provide a unique RRU identifier to the MNU 112 for that particular RRU 114. The back office software 142 may allow a user to describe the location of the ASL or provide other identifying information about the RRU. In FIG. 1, a user may utilize the back office software 142 to associate RRU 114 to a "front cargo compartment", RRU 116 to a "middle cargo compartment", and RRU 118 to a "back cargo compartment." In other words, each RRU may provide a unique identifier to the MNU 112 that can be associated with a description of storage area surrounding the RRU.

In one example of this disclosure, a calibration process may be implemented at box 310. While a calibration process will be described herein, in some embodiments there may be no calibration process at all but rather box 310 may be skipped altogether.

In the embodiment having a calibration process, the calibration process may be selected by the back office software 142 at box 310 and a calibration process 320 may be executed. For the calibration process 320, in box 312 the asset 204 having the asset tag 202 thereon may be positioned in the ASL where the asset 204 will typically be stored. Then, in box 314, the RRU corresponding with that particular ASL may measure the signal strength of the tag 202 while stored in the ASL. The asset tracking system 110 may then assign a signal strength threshold to the tag ID in box 316. The signal strength threshold may be a preset variance of the measured signal strength from box 314 or it may be a custom range input by a user through the back office software 142. Regardless, the signal strength threshold may be an expected signal strength when the tag 202 is properly positioned within the ASL but not sufficiently broad that the signal strength of the tag 202 would be within the signal strength threshold when the tag 202 is not within the ASL. In other words, the calibration process 320 may establish the expected signal strengths of tags 202 within ASLs to more clearly identify when a tag 202 is identified but not within the corresponding ASL.

In yet another embodiment, a signal strength calibration procedure is implemented to improve detectability of an asset 204 and therefore an associated tag 202 at a certain location. In this embodiment, the RRU 118 has dual modes of operation scanning for advertised information and then broadcasting for transmitting or distributing information. When in the scanning mode, the RRU 118 reads the signal strength received from a tag 202. The signal strength can be equated to the proximity of the advertiser or tag 202 to the RRU 118. This calibration process may consider various factors such as environmental conditions, obstructions between the RRU 118 and the tag 202, signal deflection, and other factors that may impact the reliability of mapping signal strength of the tag 202 to its proximity to the RRU 118.

One aspect of this disclosure implements a calibration to help improve the interpretation of signal strength to then lead to an improvement in judging proximity of a tag 202 to an RRU 118 as a function of signal strength. The calibration process may involve sampling a signal strength record by an RRU 118 for a given advertiser or tag 202 in multiple different physical situations such as some the affecting circumstances listed (i.e. environmental conditions, obstructions between the RRU 118 and the tag 202, and signal deflection among other factors). The sampling process produces signal strengths observed and fixed proximities under varying physical conditions. This data is then used to further refine the logical assessment of what is considered to be range or proximity of a tag 202 from an RRU 118. This methodology may allow greater reliability decisions made to designate a specific tag 202 as being within or outside a pre-defined proximity range or ASL.

Regardless of whether the calibration process 320 is executed, an identification process 318 may be executed once the tag ID and RRU storage information are assigned as discussed herein in boxes 302, 304, 306, and 308. FIG. 4 illustrates a schematic representation of the logic for the identification process 318. More specifically, the identification process 318 may be implemented when an event trigger occurs in box 402. The event trigger 402 may be an event selectable by the user through the back office software 142 or preset into the asset tracking system 110. In one non-exclusive example, the event trigger 402 may be a time lapse. For example, the identification process 318 may be implemented once every minute in one non-exclusive example. Alternatively, the event trigger 402 may be any time period greater or less than a one-minute interval.

In yet another example, the event trigger 402 may have a sleep mode that is selectable by a user or automatically implemented under certain conditions. The sleep mode may extend time periods between event monitoring for a tag 202 to prolong battery life among other things.

In another embodiment, the event trigger 402 may be an event of the service vehicle 100 such as when the service vehicle is put in drive, when the ignition is engaged, when the service vehicle 100 is moving, or any other event of the service vehicle 100. In other words, the asset tracking system 110 may communicate with the systems of the vehicle and utilize any of those systems as the event trigger 402. In one aspect of this disclosure, the event trigger 402 may be configured to minimize unnecessarily executing the identification process 318 when the service vehicle 100 is not in use. In yet another embodiment, the asset tracking system 110 may monitor the service vehicle 100 for prolonged inaction and automatically set the event trigger 402 to a sleep mode during prolonged periods of inaction of the service vehicle 100. The asset tracking system 110 may continually or periodically monitor for the event trigger 402.

If an event trigger 402 is identified, the asset tracking system 110 may monitor the MNU 112, and any RRUs communicating with the MNU 112, to determine whether a signal from a tag 202 has been identified in box 404. If a signal from a tag 202 is identified in box 404, the asset tracking system 110 may compare the identified signal strength of the tag 202 with the signal strength threshold identified in box 316. If the signal strength is not within the signal strength threshold, the asset tracking system 110 may return to the start of the identification process 318 or identify a tag detection that is not within the ASL.

In an alternative embodiment that does not implement the calibration process 320, the asset tracking system 110 may simply execute box 408 if a tag 202 is identified in box 404. In yet another embodiment, multiple RRUs may identify a tag 202 and box 406 may include comparing the signal strength of the tag 202 as identified by multiple RRUs. The RRU with the greatest signal strength may be selected by the MNU to assign the corresponding ASL for the tag 202.

Regardless, once a tag 202 is identified and associated with an RRU, and in the proper signal strength threshold if applicable, the MNU 112 may determine whether the RRU that identified the signal is a remote RRU such as remote RRU 120 in box 408. The MNU 112 may utilize the lookup table with the RRU ID information to determine which RRU identified that tag 202. If the RRU identifying the tag 202 signal is not a remote RRU, the asset tracking system 110 may execute box 410 and send the tag ID and ASL data associated with the RRU to the MNU 112. This may include the tag ID and an RRU ID which is then compared to the lookup table to provide the specific details about the asset 204 the tag 202 is coupled to and the ASL of that particular RRU. Regardless, in box 412 the asset tracking system 110 may interpret both the tag ID and RRU ID to provide information regarding the type of asset identified and the location of the asset in box 412.

Lastly, in box 414 the asset tracking system 110 may utilize the notifiers 124, 126, 128, a user interface, the back office software 142, or any other known identification system to provide a notification that the asset 204 associated with the tag 202 is positioned within the ASL of the RRU that identified the tag 202. In one non-exclusive example, this may be an LED light that is illuminated to show that the asset 204 is present or missing. In another example, this may be a graphic on a user interface that illustrates the presence/absence of an asset 204 in a particular ASL. Alternatively, the notification may be viewed on a mobile device through the back office software 142. Further, still, any other notification method known in the art is also considered herein for box 414.

Referring to box 408, if the RRU identifying a signal is the remote RRU 120, a remote RRU protocol 416 may be executed. The remote RRU protocol 416 may include associating the remote RRU 120 with a maintenance routine typically executed at the ASL of the remote RRU 120 in box 502. More specifically, the remote RRU 120 may be positioned at a location where a maintenance step is typically performed on an asset 204. In one non-exclusive example, the remote RRU 120 may be positioned by a refilling station for bottles utilized in a firefighting process. In this configuration, when a tag 202 is identified by the remote RRU 120 the asset tracking system 110 may assume the asset has been maintained.

In box 504 the asset tracking system 110 may associate the maintenance step with a timestamp of the time the remote RRU 120 identified the tag 202. The timestamp and maintenance step may be stored in the asset tracking system 110 for a user to identify when the asset 204 was last maintained. This information may be available through the back office software 142 or displayed on a user interface or notifier in the passenger area 104 among other places. Once the information from the remote RRU 120 is identified in box 504, the asset tracking system 110 may return 506 to execute boxes 410, 412, and 414 as discussed herein.

In one aspect of this disclosure, the teachings discussed herein could apply to any situation where there is a need to know the location status of an object at a logically pre-assigned location, whether indoor or outdoor and without the direct use of GPS technology to determine asset location. One non-exclusive example would be a work truck that has several storage compartments or ASLs for storing tools or assets. The methodology provides a mechanism for the work truck operator to know whether or not each tool is stored in its assigned compartment on the truck. As such, the asset tracking system can be implemented on any type of service vehicle, including, but not limited to, fire trucks, emergency responder vehicles, ambulances, construction vehicles, mining vehicles, and specialized goods delivery vehicles to name only a few examples.

While asset tags are discussed herein for tracking assets, the tags may also be coupled to a human or animal as well. More specifically, an asset tag may be coupled to the clothing of an emergency responder to thereby provide location information regarding the emergency responder. Accordingly, this disclosure contemplates utilizing the tags 202 to identify the location of any object, person, or animal it is coupled to. In other words, the definition of asset 204 in the context of this disclosure includes in-animate objects as well as personnel and service animals.

In one non-exclusive example, a tag 202 may be worn by a user such as a firefighter that is assigned to a service vehicle 100 that is a fire truck. In this example, if that user is not on the fire truck at time of dispatch the asset tracking system 110 would notify the crew or other personnel through the back office software 142 or notifier 124, 126, 128.

The asset tracking system 110 could also be used to detect the proximity of a missing person having a tag 202 based on the received RF signal strength of the tag 202 assigned that person. More specifically, in one embodiment the remote RRU 120 may be a handheld device capable of identifying the tag signal 202. In one non-exclusive example of this embodiment, the asset tracking system 110 may use directional signaling as defined in the Bluetooth 5 specifications to provide greater resolution in identifying an asset location.

The asset tracking system 110 may be implemented by one or more controllers on one or more of the service vehicle 100, the MNU 112, any RRU 114, 116, 118, 120, or any other system of the service vehicle 100. Further, the asset tracking system 110 may be implemented by a remote device that communicates wirelessly with MNU 112 and RRUs. Further, the control logic discussed herein may be stored locally on any one or more of the MNU 112, the RRUs 114, 116, 118, 120, the service vehicle 100, or any other system of the service vehicle 100 or stored remotely and wirelessly accessed by the asset tracking system 110.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations).

The invention claimed is:

1. A service vehicle, comprising:
a cargo area;
a passenger area;
a first storage location defined in the cargo area;
a first reader relay unit positioned proximate to the first storage location;
a second reader relay unit positioned proximate to a second storage location defined in the cargo area;
a master notification unit coupled to the service vehicle and configured to communicate with the first reader relay unit and the second reader relay unit; and
a tag configured to broadcast a tag ID to the first reader relay unit;
wherein, the first reader relay unit executes a calibration process with the tag to determine the expected signal strength when the tag is located in the first storage location;
wherein, the first reader relay unit is configured to identify the tag ID when the tag is in the first storage location having the expected signal strength and communicate with the master notification unit the tag ID and a first reader relay ID;
wherein, the tag is configured to be coupled to an asset so the first reader relay unit can identify when the asset is at the first storage location;
wherein, a signal from the tag is identifiable with both the first reader relay unit and the second reader relay unit and the master notification unit compares a first tag signal identified by the first reader relay unit with a second tag signal identified by the second reader relay unit using the the master notification unit and assigs the tag to the first assigned storage location assigned to the first reader relay unit when the signal from the tag identified by the first reader relay unit is the first expected signal strength at the first reader relay unit or assigns the tag to the second assigned storage location assigned to the second reader relay unit when the signal from the tag identified by the second reader relay unit is the second expected signal strength.

2. The service vehicle of claim 1, further wherein the Second reader relay unit is configured to communicate to the master notification unit through the first reader relay unit.

3. The service vehicle of claim 1, further wherein the second reader relay unit has a second reader relay ID and when either the first reader relay unit or second reader relay unit identify the tag ID both the tag ID and the corresponding first or second reader relay ID are communicated to the master notification unit.

4. The service vehicle of claim 1, further comprising a remote reader relay unit positioned at a location separated from the service vehicle, the remote reader relay unit configured to identify the tag ID when the tag is in a remote location proximate to the remote reader relay and communicate wirelessly with the master notification unit the tag ID.

5. A method for tracking an asset in a vehicle having a passenger area and a cargo area having a plurality of assigned storage locations, comprising:
providing a master notification unit in communication with a first reader relay unit associated with a first assigned storage location and a second reader relay unit associated with a second assigned storage location;
providing a first tag and a second tag;
positioning the first reader relay unit proximate to the first assigned storage location and positioning the second reader relay unit proximate to the second assigned storage location, wherein both the first assigned storage location and the second assigned storage location are isolated from one another in the cargo area of the vehicle;
storing information regarding the first assigned storage location associated with the first reader relay and the second assigned storage location associated with the second reader relay unit;
executing a calibration process with the first tag positioned in the first assigned storage location to establish a first expected signal strength from the first tag when positioned in the first assigned storage location;
executing a calibration process with the second tag positioned in the second assigned storage location to establish a second expected signal strength from the second tag when positioned in the second assigned storage location;
monitoring, with the master notification unit through the first reader relay unit and the second reader relay unit, for the first tag or the second tag having the first expected signal strength identified by the first reader relay unit or the second expected signal strength identified by the second reader relay unit;
transmitting a first tag ID and a first reader relay unit ID to the master notification unit from the first reader relay unit when the first tag is positioned in the first assigned storage location; and
transmitting a second tag ID and a second reader relay unit ID to the master notification unit from the second reader relay unit when the second tag is positioned in the second assigned storage location;
wherein both the first reader relay unit and the second reader relay unit have a receive mode and a transmit mode wherein the receive mode has a reduced antenna strength compared to the transmit mode.

6. The method of claim 5, further comprising coupling the tag to an asset and storing an asset description in the master notification unit and associating the asset description with the tag ID.

7. The method of claim 5, further comprising identifying a signal from a tag with both the first reader relay unit and the second reader relay unit and comparing a first tag signal identified by the first reader relay unit with a second tag signal identified by the second reader relay unit using the the master notifcation unit and assigning the tag to the first assigned storage location assigned to the first reader relay unit when the signal from the tag identified by the first reader relay unit is the first expected signal strength at the first reader relay unit or assigning the tag to the second assigned storage location assigned to the second reader relay unit when the signal from the tag identified by the second reader relay unit is the second expected signal strength.

8. The method of claim 5, further comprising providing a notifier in the passenger area to provide a visual indication when the first tag is positioned in the first assigned storage location and the second tag is positioned in the second storage location indicating assets associated with the first tag and second tag are located in the cargo area.

9. The method of claim 8, wherein the notifier is a screen in the passenger area that displays messages from the master notification unit regarding the status of the first assigned storage location and the second assigned storage location.

10. The method of claim 5, further wherein the master notification receives a tag signal from both the first reader relay unit and the second reader relay unit.

11. The method of claim 5, further comprising recording a GPS location of the vehicle with the master notification unit and recording the GPS location of the vehicle when the first tag is removed from the first assigned storage location.

12. The method of claim 5, wherein in the receive mode for the first reader relay unit, the reduced antenna strength is calibrated to be the lowest antenna strength capable of properly identifying the first tag in the first assigned storage location with the first reader relay unit.

13. The method of claim 5, wherein monitoring the first tag and the second tag is reduced after a time interval triggered by the vehicle being in motion.

14. The method of claim 5, wherein monitoring the first tag and the second tag is initiated by a sensor on a door of either the first assigned storage location or the second assigned storage location.

15. The method of claim 5, further comprising providing a remote reader relay unit and associating the remote reader relay unit with a maintenance step, wherein, when either the first tag or the second tag are identified by the remote reader relay unit a maintenance routine and date are associated with the corresponding first or second tag.

16. The method of claim 5, wherein the first reader scanning for a tag;
broadcasting findings to the master notification unit; and
relay unit and the second reader relay unit implement a cycle comprising:
entering a sleep mode for a time interval after scanning and broadcasting to reduce power consumption;
wherein the cycle repeats during use.

17. The method of claim 16, wherein the cycle exits sleep mode if the vehicle begins moving or a sensor indicates activity in either the first assigned storage location or the second assigned storage location.

18. The method of claim 5, further wherein both the first assigned storage location and the second assigned storage location have a corresponding first door and second door coupled to a corresponding first sensor and second sensor and the corresponding first reader relay unit and second reader relay unit send a signal to the master notification unit responsive to movement of either the first door identified by the first sensor or the second door identified by the second sensor.

19. A method for tracking an asset in a vehicle having a passenger area and a cargo area having a plurality of assigned storage locations, comprising:

providing a master notification unit in communication with a first reader relay unit associated with a first assigned storage location and a second reader relay unit associated with a second assigned storage location;
providing a first tag and a second tag;
positioning the first reader relay unit proximate to the first assigned storage location and positioning the second reader relay unit proximate to the second assigned storage location, wherein both the first assigned storage location and the second assigned storage location are isolated from one another in the cargo area of the vehicle;
storing information regarding the first assigned storage location associated with the first reader relay and the second assigned storage location associated with the second reader relay unit;
executing a calibration process with the first tag positioned in the first assigned storage location to establish a first expected signal strength from the first tag when positioned in the first assigned storage location;
executing a calibration process with the second tag positioned in the second assigned storage location to establish a second expected signal strength from the second tag when positioned in the second assigned storage location;
monitoring, with the master notification unit through the first reader relay unit and the second reader relay unit, for the first tag or the second tag having the first expected signal strength identified by the first reader relay unit or the second expected signal strength identified by the second reader relay unit;
transmitting a first tag ID and a first reader relay unit ID to the master notification unit from the first reader relay unit when the first tag is positioned in the first assigned storage location; and
transmitting a second tag ID and a second reader relay unit ID to the master notification unit from the second reader relay unit when the second tag is positioned in the second assigned storage location;
providing a remote reader relay unit and associating the remote reader relay unit with a maintenance step;
wherein, when either the first tag or the second tag are identified by the remote reader relay unit a maintenance routine and date are associated with the corresponding first or second tag.

20. The method of claim 19, further comprising coupling the tag to an asset and storing an asset description in the master notification unit and associating the asset description with the tag ID.

* * * * *